(12) United States Patent  
Courville

(10) Patent No.: US 7,581,834 B1
(45) Date of Patent: Sep. 1, 2009

(54) EYEGLASSES TEMPLE PIECE WITH INTEGRATED INTERCHANGEABLE RETAINING STRAP

(76) Inventor: Carolyn Courville, 1927 Long Shadow La., Spring, TX (US) 77388

( * ) Notice: Subject to any disclaimer, the term of this patent is extended or adjusted under 35 U.S.C. 154(b) by 16 days.

(21) Appl. No.: 11/620,684

(22) Filed: Jan. 7, 2007

(51) Int. Cl.
*G02C 5/14* (2006.01)
(52) U.S. Cl. ........................................ 351/121; 351/157
(58) Field of Classification Search .................. 351/41, 351/121, 156, 157, 111, 119, 158
See application file for complete search history.

(56) References Cited

U.S. PATENT DOCUMENTS

| | | |
|---|---|---|
| 4,541,696 A | 9/1985 | Winger |
| 4,603,951 A * | 8/1986 | Beck et al. .................. 351/156 |
| 5,528,800 A | 6/1996 | Kliot |
| 5,786,882 A | 7/1998 | Satterhwaite |
| 5,917,576 A | 6/1999 | Falco |
| D416,038 S | 11/1999 | Kalbach |
| 6,182,334 B1 | 2/2001 | Davancens |
| 6,511,176 B2 | 1/2003 | Kliot |
| 6,547,388 B1 | 4/2003 | Bohn |
| 6,644,808 B1 | 11/2003 | Liu |
| D486,174 S | 2/2004 | Chisolm |
| D486,511 S | 2/2004 | Kalbach |
| 6,709,100 B2 | 3/2004 | Kalbach |
| 6,736,504 B1 * | 5/2004 | Hermsen .................... 351/116 |
| 6,817,468 B2 | 11/2004 | Horesh |
| 6,905,206 B2 | 6/2005 | Skuro |
| 6,941,619 B2 | 9/2005 | Mackay |
| D513,519 S | 1/2006 | Chisolm |
| 7,399,079 B2 * | 7/2008 | Skuro ........................ 351/118 |

* cited by examiner

*Primary Examiner*—Huy K Mai

(57) ABSTRACT

An eyeglasses temple piece has an integrated retaining strap that can be interchanged as needed to complement the wearer's attire. The retaining strap is connected to the earpiece end of the temple piece by inserting the retaining strap into a passage in the interior of the earpiece. A cap at each end of the retaining strap is urged into a cavity in the earpiece to secure the retaining strap to the temple piece.

5 Claims, 1 Drawing Sheet

EYEGLASSES TEMPLE PIECE WITH INTEGRATED INTERCHANGEABLE RETAINING STRAP

CROSS-REFERENCE TO RELATED APPLICATIONS

None

FEDERALLY SPONSORED RESEARCH

Non-applicable

SEQUENCE LISTING

None

BACKGROUND OF THE INVENTION

This invention relates to eyeglasses retainers. Reading glasses are used on an intermittent basis, requiring a convenient means of conveying them with the wearer during daily activities. Sunglasses are also required intermittently, often during outdoor activities where no storage place is readily accessible. One solution to the need for ready but intermittent access to eyeglasses is to suspend the eyeglasses around the neck using a retaining strap.

In the following discussion, "temple piece" refers to the left or right pieces attached to the eyeglass lens supports and extending backwards alongside the head to a position above or behind the wearer's ears, or to any portion thereof. In the following discussion, "earpiece" refers to a portion of the temple piece that is disposed above or behind the wearer's ears. In the following discussion, "front" refers to the area close to the wearer's face. In the following discussion, "rear" refers to the area close to the back of the wearer's head. In the following discussion, "inner" refers to the side immediately adjacent to the wearer's head. In the following discussion, "interior" means contained within the body of the earpiece. In the following discussion, "temple piece" may be comprised of one element or a plurality of connectable elements. For example, an earpiece may be inserted over a narrower temple piece.

Eyeglasses retainers have been disclosed in numerous forms in the prior art. Eyeglasses retainers are commonly attached to the eyeglasses either at the rear of the earpiece or in the middle of the temple piece. An attachment point at the rear of the earpiece allows the retaining strap to be disposed behind the wearer's ear during use rather than down the side of the wearer's face, which is a preferred position for some wearers. Prior art featuring the rear attachment method includes a stand-alone cord (i.e. does not include the eyeglasses or temple piece) which uses elastomer sections to grip and attach the eyeglasses earpiece to the neck cord. Examples are U.S. Pat. No. 4,541,696 issued to Winger (1985) and U.S. Pat. No. 6,644,808 issued to Liu. However, elastomer sections do not have an aesthetically pleasing appearance. The elastomer material also tends to pull on the wearer's hair during use. In addition, the elastomer section is difficult to remove from the temple piece, so that the retaining strap is not readily interchangeable. It is desirable for the retaining strap to be readily separable from the eyeglasses, so that retaining straps of varying colors or materials can be used interchangeably to complement the wearer's casual, business or dress attire.

Other eyeglasses retainers add to the bulk of the temple piece or earpiece and are obtrusive, making them unsuitable for wear with business or dress attire. U.S. Pat. No. 6,941,619 issued to Mackay disclosed a retainer that fits around the eyeglass temple piece. U.S. Pat. No. 6,511,176 issued to Kliot discussed a retainer surrounding the temple piece or otherwise changing the dimensions of the temple piece of the eyeglasses. It would therefore be preferable to have an eyeglasses retainer that was integrated with the temple pieces without the need for obtrusive or bulky connecting mechanisms.

BRIEF SUMMARY OF THE INVENTION

It is therefore an object of the invention to provide a retaining strap integrated with the temple pieces.

It is a further object of the invention to provide a connection between the eyeglasses temple pieces and the retaining strap that is aesthetically pleasing because it does not add to the bulk of the temple pieces or change the dimensions of the temple pieces.

It is a further object of the invention to allow the connection between the retaining strap and the temple pieces to be easily and quickly accomplished so that the wearer can interchange the straps as necessary to coordinate the color or style of the retaining strap with his or her attire.

It is a further object of the invention for the connection between the eyeglasses and the retaining strap to occur at the rear of the earpiece.

It is a further object of the invention for the cavity to be on the side of the earpiece closest to the head so that the cap is concealed during wear.

The disclosed invention comprises in combination a pair of eyeglasses temple pieces integrated with the ends of a retaining strap. The connections between the temple pieces and the ends of the retaining strap are located on the side of the earpiece closest to the wearer's head and are thus concealed within the earpieces during wear. The connecting means allows the wearer to quickly and easily change retaining straps to complement the user's attire or as appropriate for the activity engaged in by the wearer. The length of the retaining strap can also be varied so that the glasses are retained on the face or suspended around the neck.

The foregoing advantages and features are accomplished by an eyeglass retaining strap that is attached to the earpiece by means of a cap that fits within a cavity leading to a passage that has an opening the inner surface of the temple piece, with the cap conforming to the shape of the cavity so that the connecting means is concealed within the hole during wear. In accordance with one embodiment, each temple piece has a passage leading from an opening in the rear surface of the earpiece to a cavity in the inner surface of the earpiece. The end of a retaining strap is inserted through the passage and out into the cavity. A cap has a shape substantially corresponding to the shape of the cavity. The cap is inserted onto the ends of the retaining strap after the retaining strap is threaded through the passage and the cap is then seated in the cavity so that it is concealed within the cavity during wear. Another embodiment features a passage having, a slit in the inner surface of the earpiece through which a ribbon-shaped strap is inserted. the retaining strap then being disposed within the interior passage of the earpiece, after which the cap is inserted into the cavity. There are preferably left and right members of each of

BRIEF DESCRIPTION OF THE SEVERAL VIEWS OF THE DRAWING

In order for the above objectives and advantages to be illustrated, a more particular description of the invention described above will be rendered by reference to specific embodiments thereof which are illustrated by the appended drawings, understanding that the drawings depict only some typical embodiments of the invention and are not therefore to be considered limiting of its scope.

DRAWINGS—REFERENCE NUMERALS

Figure 1:
FIG. 1 shows the component pieces of one embodiment prior to assembly for wear viewed from inside one temple piece. For convenience, only one temple piece of the pair is illustrated, the second temple piece being the mirror image of the first in the usual manner of eyeglasses temple pieces.

1 Temple piece
2 Rear opening
3 Shaped cavity
4 Passage connecting rear opening and cavity
5 Retaining strap
6 Threaded end member of retaining strap
7 Cap
8 Threaded recess
9 Permanent cap
10 Slitted passage
11 Ribbon retaining strap
12 Groove or ridge to assist removal

DETAILED DESCRIPTION OF THE INVENTION—FIGS. 1-4

Embodiments of the invention are illustrated in FIGS. 1-4, and described in the following text. Although the invention has been illustrated with the particular embodiments described herein, it should be understood that the invention concerns the principles by which such embodiments can be constructed and is by no means limited to the specific configurations or illustrations of the disclosed invention.

One embodiment of the apparatus is shown in FIG. 1. The temple piece 1 has an opening 2 on the rear surface of the earpiece. The earpiece contains a cavity 3 in the inner surface of the temple piece abutting the head. The cavity 3 has a predetermined shape. The end opening 2 and the cavity 3 are connected by a passage 4. The retaining strap 5 has a threaded end member 6. A cap 7 with a shape substantially corresponding to the shape of the cavity 3 contains a threaded recess 8 enabling it to mate with the threaded end member 6 at the end of the retaining strap 5.

Figure 2:
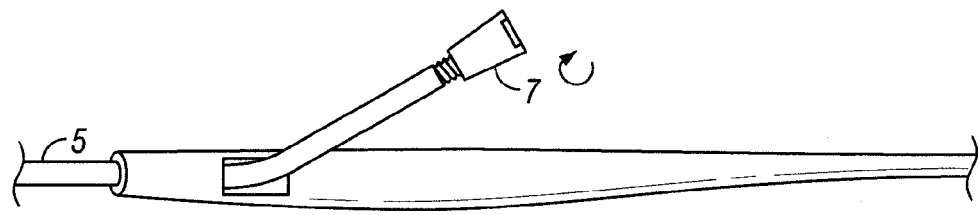
FIG. 2 is a perspective viewed from inside one temple piece illustrating the attachment of the retaining strap to the temple piece.
Figure 3:
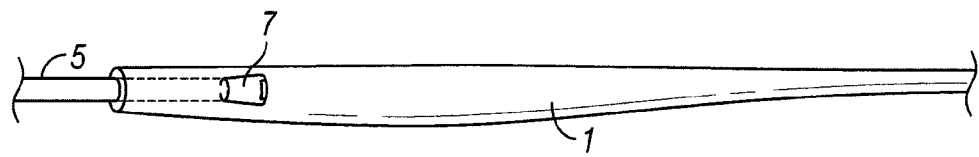
FIG. 3 shows the assembled retaining strap and temple piece viewed from inside one temple piece.

Operation—FIGS. 2 and 3

To attach the retaining strap 5 to the temple pieces 1, the wearer inserts each threaded end member 6 into the rear opening 2, through the passage 4 and out into the cavity 3. The wearer then attaches the cap 7 to the threaded end member 6 by rotating the cap around the threaded end member to engage the mating threads within the threaded recess 8 with the threads on the threaded end member 6. The wearer then urges the cap 7 into the cavity 3 so that the cap 7 is disposed with its perimeter shape congruent with the perimeter of the cavity 3. A groove or ridge 12 in the cap 7 assists removal of the cap from the cavity.

Figure 4:
FIG. 4 shows one temple piece of an alternate preferred embodiment viewed from inside one temple piece, with the component pieces and completed assembly shown.
Figure 4:
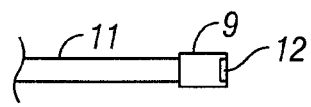
Figure 4:

FIG. 4—Alternate Embodiment

In another embodiment, a permanent cap 9 is attached to each end of a ribbon retaining strap 11, and the rear opening 2 and the cavity 3 are connected by a passage 4. The earpiece has a slit connecting the rear opening and the cavity and allowing access to the passage 10 from the inner surface of the earpiece. To attach the ribbon retaining strap 11 to the temple piece 1, the wearer inserts the ribbon retaining strap 11 through the slit, disposes the ribbon retaining strap within the passage 10, then urges the permanent cap 9 into the cavity 3.

The disclosed invention teaches that the eyeglasses temple piece and retaining strap are connected by means of two mating structures concealed within the interior of the earpiece after connection, with the mating structures located on the inner surface of the temple piece and thus being concealed by the wearer's head during wear. The present invention does not limit the nature of the mating structures.

Advantages

From the description above, a number of advantages of some embodiments of the invention are evident.

The invention features a connection point between the retaining strap and the temple pieces occurring at the rear of the earpiece rather than in the middle section of the temple piece.

The connections between the temple pieces and the retaining strap are hidden within the temple pieces and as a result are unobtrusive.

The connections do not contain any elastomer sections which may be incompatible with dress or business attire and which may cause discomfort to the wearer during use.

The retaining strap can be interchanged to complement the wearer's attire or as appropriate for the wearer's activity.

The connections between the temple pieces and the retaining strap are secure and the eyeglasses cannot be accidentally pulled away from the retaining strap.

Conclusions, Ramifications and Scope

Accordingly, the reader will see that the integrated and interchangeable retaining strap has several advantages over the prior art. Although the description above contains many specificities. these should not be construed as limiting the scope of the embodiment but as merely providing illustrations of one or more of the presently preferred embodiments. For example the cap or cavity may feature an elastomer rim to assist in securing the cap within the cavity, the cap and cavity can have mated grooves and ridges to facilitate insertion of the cap into the cavity, etc.

Thus the scope of the embodiment should be determined by the claims and their legal equivalents, rather than by the examples given.

I claim:

1. An apparatus, comprising in combination:
    a first temple piece and a second temple piece, each having an interior passage leaving from an opening in a rear surface of the ear piece to a cavity in an inner surface of the earpiece;
    a retaining strap having a first end and a second end;
    a first cap having a shape substantially corresponding to the shape of the cavity in the earpiece of the first temple piece, and a second cap having a shape corresponding to the shape of the cavity in the earpiece of the second temple piece;

a means for connecting the first cap and second cap to the ends of the retaining strap, the retaining strap being secured to the temple pieces by inserting the ends of the retaining strap into the rear opening of the earpiece, through the passage and out into the cavity, whereupon the first cap is connected to the first end of the retaining strap and the second cap is connected to the second end of the retaining strap.

2. The apparatus as recited in claim 1 further comprising a cap and a cavity having mating grooves and ridges on one or more of the perimeter edges to facilitate insertion of the cap into the cavity.

3. An apparatus, comprising in combination:

a first temple piece and a second temple piece, each having an interior passage of a substantially rectangular shape leading from an elongated opening in a rear surface of the earpiece to a cavity within an inner surface of the earpiece, and having a slit in the inner surface of the earpiece extending between the rear surface and the cavity such that the passage is accessible from the inner surface of the earpiece;

a retaining strap having a first end and a second end, the first end having a first cap with a shape substantially corresponding to the shape of the cavity in the first temple piece and the second end having a second cap with a shape substantially corresponding to the shape of the cavity in the second temple piece, the retaining strap being secured to the temple pieces by inserting the retaining strap through the slit in the first temple piece and disposing the retaining strap within the interior passage of the first temple piece, after which the first cap is urged into the cavity in the first temple piece and disposing the retaining strap within the interior passage of the second temple piece, after which the second cap is urged into the cavity in the second temple piece.

4. An apparatus as recited in claim 1 or 3 in which the first cap and second cap have an elastomer rim or in which the cavities in the first temple piece and second temple piece have an elastomer setting.

5. An apparatus as recited in claim 1 or 3 in which the caps have a ridge or groove at the distal end.

* * * * *